United States Patent [19]

Beermann

[11] 4,134,206
[45] Jan. 16, 1979

[54] CUTTER FOR VEHICLE SAFETY BELTS

[75] Inventor: Ewald H. Beermann, Solingen, Germany

[73] Assignee: Martor-Argentax E. H. Beermann KG, Solingen, Germany

[21] Appl. No.: 775,757

[22] Filed: Mar. 9, 1977

[30] Foreign Application Priority Data

Jul. 29, 1976 [DE] Fed. Rep. of Germany ... 7623799[U]

[51] Int. Cl.² ............................................ B26B 29/02
[52] U.S. Cl. ..................................................... 30/294
[58] Field of Search .................. 30/294, 286, 289, 317

[56] References Cited

U.S. PATENT DOCUMENTS 2,679,100  5/1954  Ehler ....................................... 30/294
3,673,687  7/1972  Phillips et al. .......................... 30/294

FOREIGN PATENT DOCUMENTS 603942   6/1948  United Kingdom ....................... 30/294
1386276  3/1975  United Kingdom ....................... 30/294

Primary Examiner—Robert C. Watson
Attorney, Agent, or Firm—Montague & Ross

[57] ABSTRACT

A cutter, especially for release of a passenger in an emergency from a vehicle seat belt, comprises a head gear formed on one end of a handle and having a beak-like formation projecting outwardly from the head toward the handle and defining with the head a converging mouth into which the seat belt can be inserted for engagement by a blade recessed in the head. A slot continues the line of the beak to guide the seat belt into engagement with the blade and a plate is laterally mounted on the head, either the plate or the head being provided with a recess accommodating the blade and dimensioned substantially to conform to the outline thereof.

5 Claims, 6 Drawing Figures

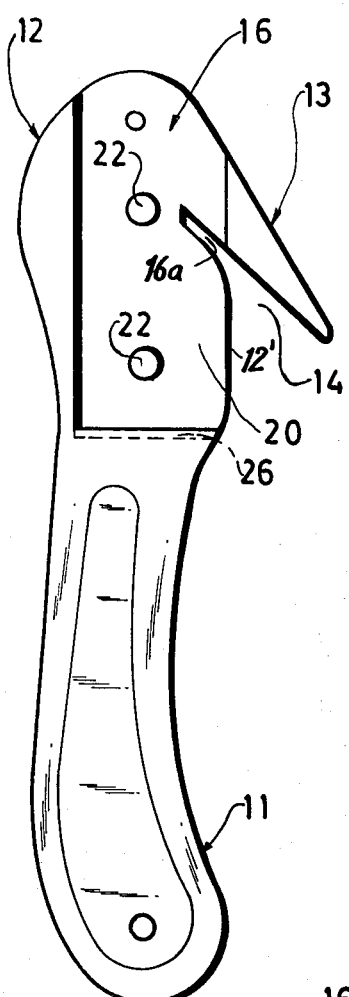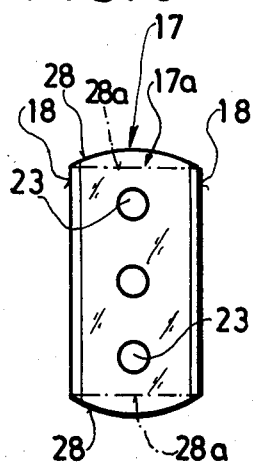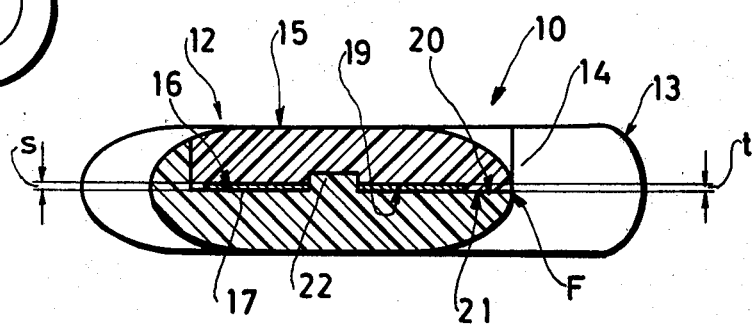

CUTTER FOR VEHICLE SAFETY BELTS

FIELD OF THE INVENTION

The present invention relates to a cutting device and, more particularly, to a cutting device for the rapid severing of a safety or seat belt of a motor vehicle to release a passenger therefrom in the event of an emergency.

BACKGROUND OF THE INVENTION

In the event of automotive-vehicle accidents, the safety or seat belt can become jammed so that the passenger cannot readily be released therefrom by the usual manipulation of the buckle. As a result, it may become necessary for the passenger to cut himself loose or for some other individual to cut the passenger loose from the safety or seat belt.

For the emergency severing of such a seat belt, it has been proposed to provide a cutting device which comprises a swingably mounted blade on a support member. This device, however, requires the use of both hands of the passenger and is frequently inconvenient to manipulate. In certain types of emergency, the passenger may not have two hands available to sever the seat belt.

A cutting device has been provided heretofore for the severing of synthetic-resin foils with particular convenience. This device comprises a handle and a head provided with a cutting blade and formed with a converging mouth or slot leading to the blade and into which the foil is fed by manipulation of the cutter to subdivide the foil.

This device, however, has not been found to be fully satisfactory in the cutting of seat belts and is not always reliable, easy to manipulate or safe.

OBJECTS OF THE INVENTION

It is the principal object of the invention to provide a cutting device which can be operated by one hand and readily can cut through a seat belt to release a passenger trapped in a vehicle.

Another object of the present invention is to provide a cutting device for the purposes described which eliminates some of the disadvantages of the aforementioned foil cutter, especially when the device is intended primarily for the severing of a seat belt.

SUMMARY OF THE INVENTION

The device according to the invention comprises a handle formed at one end with a cutting head having a beak-like guide projection which is inclined to the longitudinal dimensions of the device and projects outwardly in the direction of the opposite end of the handle, forming with the cutting head a guide passage which converges toward the blade and into which a workpiece is fed, e.g. by movement of the device relative to the workpiece, to sever the workpiece via a blade received in the head and having a cutting edge with formes the end of the feed channel. The cutting head is provided with a recess in which a cover plate is received so that the blade is sandwiched between the cover plate and the head.

It has been found that, when the plate member and the head member are provided with parallel planar surfaces between which the blade is centered interchangeably so as to be substantially fully enclosed with only the aforementioned edge exposed at the inner end of the aforementioned channel, problems arise in the use of the device for cutting a seat belt.

One of these problems is that a blade for the cutting of the seat belt must be relatively thick to be able to withstand the stresses applied during the cutting operation usually because the seat belt is relatively tough and thick, i.e. far thicker than the synthetic-resin foils severed by the prior art device mentioned above. When a blade of the type used in the foil-cutting device is exposed to the high-cutting forces which prevail in the cutting of the seat belt, the blade is readily damaged. Futhermore, fragments of the belt which are cut penetrate into the gap between the cover plate and the head member within which the blade is received to interfere with further progress of the cutting operation.

I have found that this problem can be avoided when the cutting device is additionally formed with a depression form-fittingly receiving the blade so that substantially no gap exists between the mutually confronting and engaging surfaces of the cover plate member and the head member. Advantageously, one of these members is provided with a blade-receiving recess and outside this recess engages flush with the surrounding surfaces of the opposing member so that substantially no gap or crevice is formed between the two members at the end of the guide channel.

In other words, gaps in which the seat belt or portions thereof can catch at the end of the guide channel or adjacent the latter are completely eliminated. Interference with the cutting operation is completely excluded with the cutting device according to the invention by comparison with the conventional foil-cutting device.

In addition, because the blade is closely surrounded over its entire periphery and on both of its flanks by the rigid material of the cover plate member and the head member, except for a narrow zone of the guide channel, the reaction forces resulting from the cutting force applied to the blade, can be taken up by direct contact with the members and hence the blade is not materially subjected to distortion. In other words, the blade is received practically without any play in the recess in the member which accommodates it so that the surface of the blade confronting the other member lies substantially flush with the face of the first member engageable with this other member.

Because of this construction, the blade is fully supported practically throughout its periphery.

It has been found to be especially advantageous when the blade has an outline which is substantially rectangular, i.e. has parallel long edges which are formed as cutting edges and and short edges which are substantially perpendicular to the long edges. The term "substantially perpendicular" is intended herein to mean that the opposite short edges can be either rectilinear and perpendicular to the rectilinear long edges, or can be slightly outwardly convex and curvilinear in configuration (i.e. somewhat arcuate). Hence the short edges of the blade may be straight or rounded according to a feature of the invention.

According to still another feature the invention, the depth of the recess form-fittingly accommodating the blade is substantially equal to the thickness of the blade. This recess may be provided either wholly in the cover plate member or wholly in the head member with similar effects.

Tests have shown that the cutting device of the present invention can be readily operated with a single hand, completely without difficulty and reliably to sever a seat belt of any conventional type. Of course, it can also be used effectively whenever the severing of fabric materials which might fragment is required, e.g. for the cutting of garments from the person to expose a wound, wrapping straps, refuse containers and ties therefor, adhesive bandages or the like.

BRIEF DESCRIPTION OF THE DRAWING

The above and other objects, features and advantages of the present invention will become more readily apparent from the following description, reference being made to the accompanying drawing in which:

FIG. 2 is a side-elevational view identical to that of FIG. 1 but with the cover plate and blade removed;

FIG. 3 is a side-elevational view of a blade of the type which has been removed from the cutter of FIG. 1, the dot-dash line illustrating an alternative configuration;

FIG. 4 is an internal-elevational view of the cover plate as removed from the cutter of FIG. 1;

FIG. 5 is a cross-sectional view taken along the line V — V of FIG. 1; and

SPECIFIC DESCRIPTION

Figure 1:
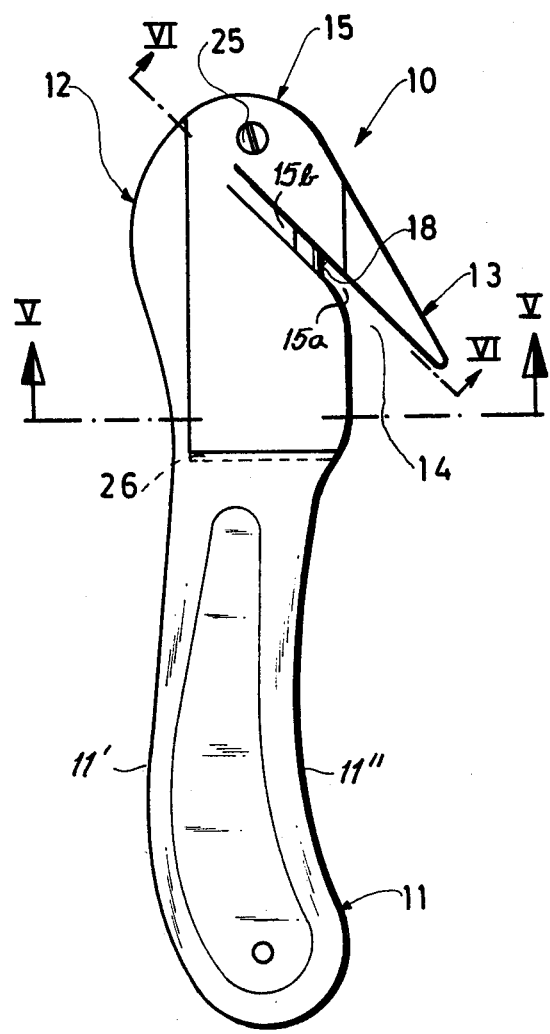
FIG. 1 is a side-elevational view of the seat belt cutter of the present invention.

The cutting device 10 illustrated in the drawing for severing through a vehicle seat belt or the like comprises a handle 11 which is generally planar and convex at one side 11' and concave on the opposite side 11". The upper end of the handle is provided with a head member 12 which is formed unitarily, i.e. by molding integrally with the handle and head, with a beak-like projection extending laterally on the concave side of the handle and inclined downwardly. The beak 13 can best be seen in FIG. 2 and forms, with an edge 12' of the head, a guide passage 14 which converges toward the head and communicated with a parallel-wall slot 16a lying inwardly of the edge 12'. The workpiece, usually a seat belt or other web or band, can be received in this slot after being fed through the converging channel 14, i.e. is guided by the beak 13 into the slot 16a.

As can be seen from FIG. 1, a cover plate 15 is attached to the head 12 by a screw 25 and defined (FIGS. 2 and 5) with the planar surface 20 a depression 19 accommodating a blade 17. The cover plate can be fitted into a recess 16.

In FIG. 1 only a portion of one of the cutting edges 18 of the blade is exposed and can be seen to overlie the slot 16a for engagement with the seat belt or other web which is fed into the slot 16a through the guide channel 14. The blade edge 18, as seen in FIG. 1, i.e. when the blade is in position, is thus set back from the channel 14 and cannot come into contact with portions of the body, especially the fingers.

In FIGS. 4 and 5 I have shown in greater detail the depression 19 which is generally flat and has a depth t equal to the thickness s of the blade 17 and a boundary identical in configuration to the periphery of the blade 17. In fact, the blade 17 is fully received in the recess 19 with its side turned toward the head 12 lying coplanar or flush with the face of the plate 15 which rests against the surface 20. Hence, this side of the blade also rests directly against the planar surface 20.

Because of this construction, when the cover plate and blade are applied to the head 12 (FIGS. 1 and 5) the junction F or crevice between the plate and the head has practically zero width, i.e. no seat belt fragments can become caught in this crevice.

To center the blade 17, I have provided two pins 22 on the head 12, the pins being cylindrical and rising from the planar surface 20 to fit into holes 23 formed in the blade 17. Cylindrical recesses or blind bores 24 may also be provided in the cover plate 15 to accommodate the portions of pins 22 projecting beyond the blade so as to center the cover plate as well. While two screws 25 on opposite ends of the cover plate can be used to secure the latter to the head 12, I prefer to provide a tongue-and-groove connection 26 between the lower end of the cover plate and the bottom of the recess 16 to enable the cover plate to be fitted in place and secured by the single screw 25.

Figure 6:
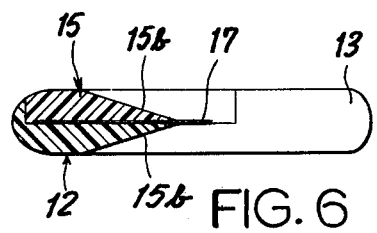
FIG. 6 is a cross-sectional view taken along the line VI — VI of FIG. 1 but through the cover plate only.

As can be seen from FIG. 4, the boundaries of the depression 19 conform precisely to those of the blade 17 which is received without any play in the plane of the blade. In the embodiment illustrated in solid lines, the generally rectangular blade has its long parallel and rectilinear sides provided with cutting edges 18 and has outwardly convex rounded sides at 28. Instead of rounded edges, of course, short ends of the blade can be rectilinear as represented by dot-dash lines at 28a. The cover plate 15 of FIG. 3 can thus have arcuate boundaries 27 to accommodate the arcuate ends 28 of the blade. A slot 15a in the cover plate 15 (FIGS. 1, 4 and 6) registers with the slot 16a and extends beyond the edge 18 of the blade which is effective in the cutting operation. It has been found to be advantageous to extend the slots 15a and 16a with ramps as shown at 15b in FIGS. 1 and 6.

I claim:

1. A cutting device, especially for the cutting of webs such as vehicle seat belts, said device comprising:
   an elongated handle;
   a head member formed on said handle at one end thereof, said head member having a generally planar surface, and a beak extending downwardly and defining a guide channel for a web to be severed converging toward said surface;
   a cover plate member overlying said surface of said head member being provided with a planar face parallel to said surface; and
   a flat blade sandwiched between said face of said cover plate member and said surface of said head member and having a cutting edge exposed at an inner end of said channel for severing said webs at least one of said members being formed with a depression accommodating said blade such that no gap between said members is present in the region of said cutting edge to catch pieces of said web, said depression having a depth substantially equal to the thickness of said blade and being formed only in said cover plate member, said head member being formed with a recess provided with said surface at the bottom thereof, said channel opening into a parallel-wall slot extending into said recess, said cover plate member being receivable in said recess and attached to said head member by at least one screw, said cover plate member being provided with a parallel-wall slot aligned with the slot of said head member, said blade having a pair of linear opposite parallel cutting edges one of which is exposed in said slots and is set back from the junction of said slots with said channel away from the beak to preclude contact of said exposed edge with the fingers of the user, said depression having boundaries conforming to the configuration of said blade and surrounding the periphery thereof without play, said head member being formed with a pair of pins rising from said surface, said blade being provided with respective holes traversed by said pins and said cover plate member has a pair of blind bores accommodating said pins, said slots on opposite sides of the device extending into respective ramps inclined away from said blade, said beak, said head member and said handle being formed unitarily from a synthetic-resin.

2. The device defined in claim 1 wherein said blade is generally rectangular and said depression is of corresponding configuration.

3. The device defined in claim 2 wherein said blade has a pair of opposite short ends.

4. The device defined in claim 3 wherein said short ends are outwardly convex.

5. The device defined in claim 3 wherein said short ends are rectilinear and perpendicular to said cutting edges.

* * * * *